UNITED STATES PATENT OFFICE 2,403,931

CATALYTIC ALKYLATION PROCESS

Carl S. Kuhn, Jr., Dallas, Tex., assignor to Socony-Vacuum Oil Company, Incorporated, New York, N. Y., a corporation of New York No Drawing. Application September 24, 1942, Serial No. 459,526

8 Claims. (Cl. 196—10)

This invention relates to the synthesis of branched-chain, paraffinic hydrocarbons by the alkylation of isoparaffins with olefins in the presence of a catalytic agent. More particularly this invention relates to such a catalytic alkylation process in which ethylene is the olefinic alkylating agent used.

Many catalytic processes for the alkylation of isoparaffinic hydrocarbons with olefins have been developed in recent years. Such processes have been particularly concerned with the alkylation of such isoparaffins as isopentane and isobutane with such olefins are propylene, butylene and amylene to produce branched-chain hydrocarbons boiling in the gasoline range and having a high octane value. Typical of the catalytic agents which have been used are the Friedel-Crafts catalysts, especially aluminum chloride, boron trifluoride and its complexes, hydrofluoric acid and sulphuric acid, and the like. The acid catalysts, sulphuric and hydrofluoric acid, have received particular attention as the catalysts for the alkylation reactions of the type mentioned above, but have proven to be quite ineffective for the alkylation of isoparaffins with ethylene.

Under normal conditions of temperature and within the pressure range at which the hydrocarbons can be maintained in the liquid phase, concentrated sulphuric acid will cause such olefins as amylene and butylene to combine with the various isoparaffins with the resultant formation of upwards of 100 weight percent yield of alkylate product on the basis of the particular olefin charged. However, where ethylene is used as the olefinic reactant, the yield of alkylate product on the basis of ethylene charged is generally within the range of from 15 to 30 percent, depending upon the exact alkylating conditions and the catalyst used.

Recently various attempts have been made to improve the yield of alkylate product obtained in ethylene alkylation. The addition of various metallic oxides has been proposed. Another proposal has been the addition of propylene to the ethylene and the subsequent alkylation of this mixture with the thought that the alkylation of the propylene would simultaneously induce the alkylation of a greater proportion of the ethylene. The increase in yield obtained by the use of these methods is rather limited, and the second of these proposals is complicated by the problem of handling a mixture of two olefins. Likewise, the addition of various metallic salts of organic and inorganic acids to the sulphuric acid catalyst has been suggested. The manner in which these salts are to be added, the mode of carrying out the alkylation reaction in the presence of these salts, and the extent and nature of the improvement effected, are very indefinite.

The primary object of my invention is to develop a catalytic process for the alkylation of such isoparaffins as isobutane, isopentane and isohexane with ethylene utilizing concentrated sulphuric acid as the effective catalytic agent to produce alkylates which are of value as high octane aviation motor fuel ingredients. Another object of my invention is to provide a catalyst or a catalyst mixture which may be readily handled in existing types of alkylating equipment without requiring additional equipment and without introducing additional problems of agitation. A still further object of this invention is to promote the effectiveness of the sulphuric acid catalyst whereby the alkylation of isoparaffins with ethylene will be favored in preference to the formation of ethyl sulphate and to any polymerization of the ethylene, and the yield of alkylate product based on the amount of ethylene charged will be much higher than that obtained with the unpromoted sulphuric acid catalyst.

My invention is based upon my discovery that the alkylation of isoparaffins with ethylene utilizing concentrated sulphuric acid as the catalytic agent may be accelerated by the addition of the cyanides of silver or mercury. These cyanides do not react with concentrated sulphuric acid at normal or moderately elevated temperatures. Silver cyanide is soluble in the concentrated acid. Mercuric cyanide, although it is not soluble in the concentrated acid, is readily dispersed in the acid and gives no additional agitation problem in handling the acid-hydrocarbon reaction mixture. Mercuric cyanide may advantageously be added to the acid catalyst by dissolving it in a small amount of hot water in which it is very soluble, and adding the sulphuric acid rapidly to this solution. The acid will throw the mercuric cyanide out of solution as an exceedingly fine, almost colloidal, dispersion. The mercuric cyanide may also be added directly to the concentrated acid, and the agitation normally used in an alkylation reaction is sufficient to disperse the salt in a short time. In any event, regardless of whether the cyanides of silver or mercury are used, the intimate dispersion of the cyanide throughout the reaction mixture is achieved without requiring additional agitation, and results in a very great increase in the alkylation efficiency with the use of only a small amount of the cyanide salts. The cyanides appear more effective than any other salts tried both from the standpoint of promoting the alkylation, and from the standpoint of ease of processing. These salts offer an additional advantage in that they separate along with the acid layer from the hydrocarbon mixture, rather than precipitating as a separate layer, and are available for reuse directly by simple recirculation of the acid catalyst.

In general, the conditions used for carrying out my process for alkylation with ethylene utilizing the promoted sulphuric acid catalyst, are the same as for the conventional alkylation practice with the sulphuric acid catalyst alone. The reaction is generally carried out under sufficient pressure to maintain the reactants in the liquid phase. The temperature may vary from about $-10°$ C. to about 60° C. An excess of the isoparaffin over that theoretically required to react with the ethylene added is used, as is customary in alkylation reactions. The improved results are effected by the addition of a small quantity, preferably about 1 mol percent of either mercuric cyanide or silver cyanide to the catalyst. These salts may be readily dispersed in the concentrated acid, and the promoted catalyst may be handled in the conventional manner.

The following specific examples of operation are given to illustrate the principles of my invention and the manner in which my invention may be carried out. These examples are illustrative only, and are not to be construed as limiting the scope of my invention to the details set forth therein.

*Example 1*

A mixture of 550 parts by weight of concentrated sulphuric acid, 66° Baumé, in which 15.7 parts by weight (1.13 mol percent) of mercuric cyanide had been dispersed, and 580 parts by weight of liquid isobutane were placed in a reactor provided with a suitable agitator and a cooling jacket. The agitator was placed in operation and to the agitated mixture 56 parts by weight of ethylene were added continuously over a period of 110 minutes. During the addition of the ethylene, cold kerosene was circulated through the cooling jacket to maintain the temperature of the reaction mixture at 20° C. After the addition of the ethylene was completed, the agitation was discontinued and the mixture allowed to separate into two liquid phases. The upper phase consisted of the hydrocarbon reactants and product and the lower phase consisted principally of the sulphuric acid catalyst containing the mercuric cyanide. The acid was withdrawn, and the hydrocarbon phase was washed with water, dried, and fractionated to recover the material distilling above 25° C. The yield of alkylate was 118 percent based on the weight of ethylene charged. This product was composed primarily of branched-chain hexanes and octanes of high antiknock value.

Similar results were obtained where silver cyanide was substituted for mercuric cyanide as the catalyst promoter.

For comparison purposes the following experiment was performed to show the relative amount of ethylene converted to alkylate using unpromoted sulphuric acid as the catalyst.

*Example 2*

A mixture of 550 parts by weight of concentrated sulphuric acid and 580 parts by weight of isobutane were placed in a jacketed reactor provided with an agitator. To the well agitated mixture 56 parts by weight of ethylene were added continuously over a period of 110 minutes while maintaining the temperature at 20° C. in the manner described in Example 1. The mixture was then drawn off, and the hydrocarbon phase separated was analyzed to determine the percentage of ethylene charged converted to alkylate. The yield was 21.4 percent on the basis of ethylene charged.

While varying the reaction conditions and the isobutane-ethylene ratio will vary the weight percent yield of alkylate product based on ethylene charged, somewhat, this figure of 21.4 percent represents a typical value.

In order to illustrate my invention further the following example was performed to show that the improvement obtained in sulphuric acid alkylation was apparently specific to the cyanides of silver and mercury.

*Example 3*

A mixture of 550 parts by weight of concentrated sulphuric acid to which had been added 11.1 parts by weight (1.13 mol percent) of cuprous cyanide, and 580 parts by weight of isobutane were placed in a reactor as described in Example 1. To this agitated mixture was added 56 parts by weight of ethylene over a period of 120 minutes. The temperature was maintained at 20° C., and after the reaction was completed, the phases were separated and recovered in the manner described in Example 1. The yield of alkylate was 8.9 percent based on the weight of ethylene charged.

From this example it can be seen that not only will some metallic cyanides fail to show any promotional effect towards sulphuric acid ethylation, but some of the cyanides will actually inhibit the reaction. Also, many cyanides are not suitable since they will react with strong sulphuric acid at the reaction temperature and liberate hydrogen cyanide.

In the foregoing examples and discussion I have shown that the amount of mercuric or silver cyanides used is about 1 mol percent based upon the weight of the acid catalyst. This represents the preferred concentration. Favorable results may be obtained by the use of from 0.2 to 2.0 mol percent of the cyanide promoter in the acid catalysts. Where the amount of cyanide promoter is much less than 0.2 mol percent, the increase in yield of alkylate drops to fairly small values. Greater amounts of the cyanide than 2.0 mol percent may be used, but no advantage is obtained by increasing the amount, and increase in cost of promoter and difficulty in dissolving or dispersing the larger amounts of the promoter would render the use of a much larger amount of these salts undesirable. The use of larger amounts of these cyanide salts is not to be construed as lying outside the scope of my invention, however, for excellent results can be obtained by the use of much greater quantities.

Although, theoretically, temperatures up to the critical temperature of the isoparaffin may be used in the alkylation reaction, in actual practice temperatures above about 60° C. should not be used because of the strong oxidizing effect of sulphuric acid at elevated temperatures. Preferably temperatures of from $-10°$ C. to 45° C. are used.

In the specific examples I have illustrated the process as a batch operation in which ethylene is introduced into a vigorously agitated mixture of isoparaffin and catalyst. Obviously my process is well adapted to continuous operation as is conventional in alkylation practice with butylene, and operation in this manner is preferable for large scale, commercial practice.

The ethylene used in my process need not necessarily be pure. The gas may contain inert gaseous materials such as normal paraffins, and small amounts of other olefins.

In the foregoing description of my invention and in the appended claims, the term "isoparaffins" includes aliphatic, saturated hydrocarbons having a tertiary carbon atom and having from four to six carbon atoms.

The above description of my invention is merely illustrative of the preferred mode of operation thereof, and my invention should not be limited except as indicated in the appended claims.

I claim:

1. A process for the alkylation of isoparaffins with ethylene which comprises contacting the isoparaffin with the ethylene in the presence of a catalyst comprising concentrated sulphuric acid and a metallic cyanide selected from the group consisting of mercuric cyanide and silver cyanide.

2. A process for the alkylation of isobutane with ethylene which comprises contacting the isoparaffin with the ethylene in the presence of a catalyst comprising concentrated sulphuric acid and a metallic cyanide selected from the group consisting of mercuric cyanide and silver cyanide.

3. A process for the alkylation of isoparaffins with ethylene which comprises contacting the isoparaffin with the ethylene in the presence of a catalyst comprising concentrated sulphuric acid and mercuric cyanide.

4. A process for the alkylation of isoparaffins with ethylene which comprises contacting the isoparaffin with the ethylene in the presence of a catalyst comprising concentrated sulphuric acid and silver cyanide.

5. A process for the alkylation of isoparaffins with ethylene which comprises contacting the isoparaffin with the ethylene in the presence of a catalyst comprising concentrated sulphuric acid and more than 0.2 mol percent, based on the amount of concentrated sulphuric acid, of a metallic cyanide selected from the group consisting of mercuric cyanide and silver cyanide.

6. A process for the alkylation of isobutane with ethylene which comprises contacting the isoparaffin with the ethylene in the presence of a catalyst comprising concentrated sulphuric acid and from 0.2 to 2.0 mol percent based on the amount of concentrated sulphuric acid, of a metallic cyanide selected from the group consisting of mercuric cyanide and silver cyanide.

7. A process for the alkylation of isoparaffins with ethylene which comprises contacting the isoparaffin with the ethylene in the presence of a catalyst comprising concentrated sulphuric acid and a metallic cyanide selected from the group consisting of mercuric cyanide and silver cyanide, and maintaining the temperature within the range of from $-10°$ C. to about $60°$ C.

8. A process for the alkylation of isobutane with ethylene which comprises contacting the isobutane with the ethylene in the presence of a catalyst comprising concentrated sulphuric acid and a metallic cyanide selected from the group consisting of mercuric cyanide and silver cyanide, and maintaining the temperature within the range of from $-10°$ C. to about $45°$ C.

CARL S. KUHN, Jr.